United States Patent

Sunshine et al.

[11] Patent Number: 6,033,602
[45] Date of Patent: Mar. 7, 2000

[54] CATHODE MEMBER INCLUDING FLUORINATED ION EXCHANGE POLYMER FOR WATER-ACTIVATED STORAGE BATTERY

[75] Inventors: Morton Sunshine, Hollywood; Syed Zaigham Abbas Zaidi, Boca Raton; William R. Kuenzel, Boynton Beach, all of Fla.

[73] Assignee: Prosar Technologies, Inc., Deerfield Beach, Fla.

[21] Appl. No.: 09/055,118

[22] Filed: Apr. 3, 1998

[51] Int. Cl.[7] .................. H01B 1/06; H01B 1/02
[52] U.S. Cl. .................. 252/511; 252/512; 252/513; 252/514; 429/119
[58] Field of Search ................. 429/119, 220, 429/231.8, 212, 213, 215, 217; 252/511–513, 519.33

[56] References Cited

U.S. PATENT DOCUMENTS

| | | | |
|---|---|---|---|
| 2,658,935 | 11/1953 | Chubb | 136/100 |
| 4,016,339 | 4/1977 | Gray et al. | 429/219 |
| 4,085,071 | 4/1978 | Resnick et al. | 260/22 R |
| 4,262,069 | 4/1981 | Devitt et al. | 429/225 |
| 4,267,364 | 5/1981 | Grot et al. | 560/183 |
| 4,487,821 | 12/1984 | Häkkinen | 429/119 |
| 5,228,529 | 7/1993 | Rosner | 180/65.3 |
| 5,395,707 | 3/1995 | McCarter et al. | 429/119 |
| 5,424,147 | 6/1995 | Khasin et al. | 429/119 |
| 5,441,830 | 8/1995 | Moulton et al. | 429/212 |
| 5,464,707 | 11/1995 | Moulton et al. | 429/212 |

FOREIGN PATENT DOCUMENTS

| | | |
|---|---|---|
| 872415 | 6/1971 | Canada . |
| 53-4824 | 1/1978 | Japan . |
| 160207 | 1/1964 | U.S.S.R. . |

*Primary Examiner*—Yogendra Gupta
*Assistant Examiner*—Derrick G. Hamlin
*Attorney, Agent, or Firm*—Schnader Harrison Segal & Lewis

[57] ABSTRACT

Disclosed is a water-activated battery comprising an anode member and a cathode member which comprises cuprous chloride, graphite, and a fluorinated ion exchange polymer having at least one pendant sulfonic acid group. Such a battery is capable of being activated in fresh water or sea water.

13 Claims, No Drawings

CATHODE MEMBER INCLUDING FLUORINATED ION EXCHANGE POLYMER FOR WATER-ACTIVATED STORAGE BATTERY

BACKGROUND OF THE INVENTION

1. Field of the Invention

This invention relates to water activated batteries, a known category of batteries designed to remain inactive when kept dry and to begin generating an electric current rapidly upon activation by contact with an aqeuous solvent such as sea water or fresh water.

Such batteries find use on life rafts, life vests, survival kits and the like to power a signal light for use in an emergency and other types of electrical equipment.

2. Prior Art.

Khasin U.S. Pat. No. 5,424,147 discloses a water activated battery in which the cathode comprises a skeletal frame including conductive metal and having a portion of its surface area formed as open spaces, and further comprising a heat pressed rigid static bed of active cathode material encompassing the frame and formed of cuprous chloride, sulfur, carbon and a water ionizable salt. The only water ionizable salts disclosed are sodium chloride and calcium sulfate, and a preference is expressed for salts that are sparingly soluble in water having a solubility of less than 50 grams per liter (see col 3 lines 15–16).

Rao U.S. Pat. No. 5,225,291 disclosed a water actuated battery including a plurality of electrochemical cells including a "hybrid cathode member" which is described (col 3 lines 21–28) as formed of a material exhibiting inertness (low corrosion) such as nickel, stainless steel, titanium, graphite, carbon etc suitably subjected to catalytic activation. There is no mention of a cuprous halide ingredient.

Japan 53-4824 (Yuasa 1978) discloses a sea water battery of specified design in which the cathode contains silver chloride, copper chloride, copper sulphate or manganese dioxide. There is no mention (in the English language abstract) of graphite as a constituent of the cathode.

Japan 47-43887 (Yuasa 1972) discloses a magnesium salt-water cell including a silver chloride, copper chloride, manganese dioxide, air etc cathode and further containing a crystalline or glassy water-soluble weak acid or its anhydride. The only specific "weak acid or anhydride" disclosed (in the English abstract) is tartaric acid.

Chubb U.S. Pat. No. 2,658,935 discloses a magnesium—cuprous chloride "meterological" or "one-shot" battery in which the cuprous chloride electrode is porous and contains a cuprous chloride paste containing finely ground cuprous chloride, water, and a solution of a high polymer such as polystyrene in an organic solvent, optionally a plasticizer for the polystyrene, and various inert conductive materials added to improve the conductivity of the cuprous chloride such as carbon black or graphite.

Resnick et al U.S. Pat. No. 4,085,071 discloses fluorinated ion exchange polymers formed by hydrolysis of a precursor polymer containing pendant side chains with sulfonyl fluoride groups, and use thereof in the electrolysis of an aqueous solution of an alkali or alkaline earth metal halide to produce hydrogen and the corresponding halogen and metal hydroxide, as in the chlor-alkali industry. Here the ion exchange polymer replaces separators in the electrolytic cell which must withstand a hostile environment such as highly alkaline pH as well as exposure to chlorine and concentrated brine at temperatures approaching 100° C. There is no suggestion of the applicability of such polymer to service in a water activated battery in which the conditions are entirely different.

There still remains a need for an improved water-activated battery able to activate rapidly in both salt and fresh water and to maintain its ability to power a signal light or other electrically powered device for extended periods.

SUMMARY OF THE INVENTION

In accordance with this invention, a water-activated battery, stored in a dry condition and activated at the time of use by the addition of an aqueous solvent, comprises a cathode member and an anode member, in which said cathode member comprises cuprous chloride, graphite, and a fluorinated ion exchange polymer having at least one pendant sulfonic acid group.

As a result of an unexpected and advantageous interaction of the essential cuprous chloride, graphite, and fluorinated ion exchange polymer components of the cathode member, a battery according to this invention activates rapidly, in fresh water within 60 seconds after immersion to 1 volt minimum with a typical use load of about 200 milliamperes and within ten seconds after immersion in salt water with such use load, and attains a higher voltage than batteries lacking any one of the essential components. A practical benefit of this rapid activation is seen in a signal light powered by a battery according to this invention. Such a signal light attains a light intensity of one candela within 60 seconds after immersion, in either sea water or fresh water. A further advantage of this invention is the maintenance of the light intensity of a signal light according to this invention for at least 8 hours of continuous service.

Additional advantages of the water-activated battery of this invention and signal light powered by such battery include the ability to withstand prolonged storage under varied conditions of temperature and humidity prior to activation and use without loss of rapid activation, achievement of high light intensity, and durability thereof. A further advantage of the water-activated battery of this invention is the absence of noticeable odor throughout storage and use.

DETAILED DESCRIPTION OF THE INVENTION AND THE PREFERRED EMBODIMENTS

In a preferred water-activated battery according to this invention, the cathode member comprises 50 to 95 parts by weight of cuprous chloride, 2 to 15 parts of graphite, and 0.015 to 0.035 parts by weight on a dry basis, preferably 0.02 to 0.03 parts by weight on a dry basis of fluorinated ion exchange polymer having at least one pendant sulfonic acid group.

Readily available commercial grades of cuprous chloride can be used according to this invention with excellent results. Graphite in the cathode member according to this invention imparts important advantages. One vital role of the graphite component is its contribution to the rapid activation of the battery upon immersion in fresh water. Another important function of the graphite component is coating the particles of cuprous chloride. A further important feature of the graphite component is that in its presence the parts can be plated by known electrolytic or electroless techniques with metals such as copper, nickel, or silver. Such plating can become a base to which a copper, nickel, or silver wire can be soldered or welded, preferably a wire of the same metal as the plate, as a faster method of production than embedding such wire inside the plate or die.

Many forms of graphite effective according to this invention are commercially available, including a Dixon Ticonderoga Co (Lakehurst N.J. 08733) grade of Natural Flake Graphite having specific gravity approximately 2.2 and containing maximum 5% ash and minimum 95% carbon by weight loss upon ignition, of which 98.7% passes a 325 mesh screen.

The fluorinated ion exchange polymer having at least one pendant sulfonic acid group can have a single pendant sulfonic acid group or a plurality of such groups pendant from a fluorinated polymer chain. Preferably, the fluorinated ion exchange polymer is a hydrolyzed copolymer of a fluorinated vinyl compound monomer and a sulfonyl-containing monomer. Fluorinated vinyl compound monomers include vinyl fluoride, hexafluoropropylene, vinylidene fluoride, trifluoroethylene, chlorotrifluoroethylene, perfluoro(alkyl vinyl ether), tetrafluoroethylene and combinations thereof. Sulfonyl-containing monomers copolymerized with the fluorinated vinyl compound monomer can be represented by the formula $CF_2=CFY_nSO_2Hal$, wherein Hal represents fluorine or chlorine, n represents zero or one, and Y is a bifunctional fluorinated radical including 2 to 8 carbon atoms. Y can be branched or unbanched straight chain, and can include one or more ether oxygen linkages.

Thus, sulfonyl-containing monomers particularly suitable for copolymerization with fluorinated vinyl compounds include the monomers $CF_2=CFSO_2F$, $CF_2=CFOCF_2CF_2SO_2F$, $CF_2=CFOCF_2CF(CF_3)OCF_2CF_2SO_2F$, $CF_2=CFCF_2CF_2SO_2F$, $CF_2=CFOCF_2CF(CF_2OCF_3)OCF_2CF_2SO_2F$, and $CF_2=CFOCF_2CF(CF_3)OCF_2CF(CF_3)OCF_2CF_2SO_2F$.

Following copolymerization of sulfonyl-containing monomer and fluorinated vinyl compound monomer, hydrolysis of pendant sulfonyl halide groups in acidic or alkaline medium yields pendant sulfonic acid groups which can be represented by the formula $-Y_nSO_3M$, in which n and Y are as defined above and M represents hydrogen, alkali metal, or ammonium of the formula $R_4N$ in which R independently at each occurrence is hydrogen or a lower alkyl group having one to four carbon atoms.

In a particularly preferred fluorinated polymer used according to this invention, M is hydrogen in at least one occurrence of the pendant sulfonic acid group $-Y_nSO_3M$ and the polymer preferably has an equivalent weight of 1000 to 1500 milligrams per milliequivalent. Fluorinated ion exchange polymers having at least one pendant sulfonic acid group are known in the art and can be prepared as disclosed, for example, in P Resnick et al U.S. Pat. No. 4.085,071 and W Grot U.S. Pat. No. 4,453,991 whose entire disclosures are here incorporated by reference.

A particularly preferred perfluorinated ion exchange polymer is characterized by a terminal sulfonic group SO3H linked to a perfluoroalkyl group Rf through a chain of of fluoro-substituted carbon atoms which can be interrupted by ether oxygen atoms. The perfluoroalkyl group preferably has 1 to 10 carbon atoms. One such polymer is described by a vendor as white to off-white crystals with the molecular formula Rf(OCF(CH3)CF2)OCF2CF2SO3H and CAS Registry number 66796-30-3 available under the name Nafion® NR 50 resin or Nafion® perfluorinated ion-exchange resin. Also available, under the name Nafion® Solution SE-5112 is a 5.0–5.4% by weight solution based on Nafion® NR 50 resin in a mixture of water and alcohols.

In a water-activated battery according to this invention, the cathode member additionally can include an organic polymer binder capable of melting and fusing the mixture at 140–240° F. (60–116° C.) to result in a solid state upon cooling. Suitable polymer binders include polyethylene, polypropylene, ethylene—vinyl acetate copolymers, polyvinyl chloride and copolymers of vinyl chloride with other monomers such as vinyl acetate and/or maleic anhydride. Vinyl chloride polymers are preferred. The amount of binder when present can range from 3 to 15 parts by weight per 100 parts by weight of cuprous chloride and graphite combined.

The anode member in a water activated battery according to this invention is a metallic element such as aluminum, magnesium, zinc and alloys thereof. Magnesium is preferred.

Spacer members spacing said cathode member from said anode member in a water-activated battery according to this invention can comprise plastic clips or rails to hold the cathode and anode members apart without interfering with the free flow of water through the battery.

In a water-activated battery according to this invention, the cathode and anode members can be retained within any convenient carrier able to protect the members from physical abuse and damage. A close-fitting battery casing including a lid portion and openings for water to flow in and out is used. The carrier is kept closed until the battery is to be used, and then opened.

Lead wires are connected to the cathode and anode members and extend outward to a light source or other device powered by the battery. The battery carrier can be made of any material resistant to the contents of the battery and the environment, suitably a light weight plastic.

In order to provide connection between the cathode and anode members, a wire or wire mesh of copper or nickel with sufficient rigidity can be imbedded within the cathode member during the manufacturing process with a wire protruding from the mesh as the cathode's external connection. Alternatively, a copper, tinned, nickel or silver wire can be wrapped around the cathode providing the same effect as the mesh. A third choice may be a single copper, tinned, nickel or silver wire imbedded inside the cathode during manufacture.

In its primary intended use, the battery is immersed in water at the point of use. A method of battery use includes opening or removal of the carrier by the user so that the water is free to flow into the battery, whereupon the water activates the battery, functioning as a conductor receiving and suspending cations and anions from the cathode and anode members at a pre-set potential difference. Thus, when the battery is activated, aqueous solvent comes in contact with said cathode member and said anode member, a carrier protecting the cathode and anode elements when closed and when opened permitting the inflow and outflow of said aqueous solvent and enclosing said cathode member and said anode member and said aqueous solvent, and spacer members spacing said cathode member from said anode member Lead wires connecting said cathode member and anode member to an external device complete the circuit.

Following Examples are provided by way of illustaton and not of limitation.

EXAMPLES 1–3 and COMPARISON CONTROL

In each of Examples 1–3, a mixture was prepared of cuprous chloride, 94 parts by weight, graphite (Grade HPN-2 from DIXON TICONDEROGA CO.) 3 parts by weight, VMCA (Union Carbide) vinyl chloride copolymer 3 parts by weight and Nafion® SE 5112 solution of pendant sulfonic acid group containing fluorinated polymer 0.5 parts by weight.

A Control mixture prepared for purpose of comparison was prepared from each of the above ingredients in the same amounts except that Nafion® SE 5112 solution of pendant sulfonic acid group containing fluorinated polymer was omitted.

The materials were ground to a fine powder until the mixture was uniform in color and appearance.

Approximately 14 grams of each mixture was pressed in a punch and die to form a plate or tablet at approximately 225° F. (107° C.). In Example 1 and Comparison Control. Prior to pouring the powder into the cavity, a silver wire about 0.02–0.03 inches in diameter formed in the shape of a figure-eight was placed in the cavity to perform the function of a lead wire from the cathode. Examples 2 and 3 were processed in the same way except that they utilized an expanded nickel grid and #22 nickel wire respectively instead of the silver wire. The resulting tablets or plates measured 2.75 by 0.75 by 0.100+0.02 inches.

The cathodes thus prepared were assembled with plastic clip insulators between cathode and two anodes made of magnesium plates measuring 2.75 by 0.75 by 0.03 inches and inserted in a plastic case. The lead wires from cathode and anodes were connected to a bulb rated at 1.35 volts at a load of 200 milliamperes.

Assemblies prepared according to Example 1 and Control Comparison were tested in fresh water and in salt water. Results are shown below.

| Composition | Example 1 | Control Comparison |
| --- | --- | --- |
| Fresh water start voltage at 3 minutes | 1.25 at 200 ma load | 0.62 at 195 ma load |
| Salt water start voltage at 10 seconds | 1.38 at 225 ma load | 1.33 at 225 ma load |
| Operating life | 9 hours | 4 hours |

The results of Examples 2 and 3 were substantially the same as those of Example 1.

The results show the formulations of Examples 1, 2, and 3 starting up sufficiently in fresh water and having operating life sufficient for commercial use while the Control composition was unsatisfactory.

Thus, an assembly according to this invention has been tested and found to meet all required functions for an emergency signal light including activation in fresh water. Comparisons have shown that the interaction of the fluorinated ion exchange polymer having at least one pendant sulfonic acid group with the other ingredients not only provides coverage protecting against the elements but also contributes to start-up in fresh water; a comparable cathode without this polymer does not function as well in fresh water.

We claim:

1. A water-activated battery comprising an anode member and a cathode member wherein said cathode member comprises cuprous chloride, graphite, and a fluorinated ion exchange polymer having at least one pendant sulfonic acid group.

2. A water-activated battery according to claim 1 capable of being activated in fresh water or sea water.

3. A water-activated battery according to claim 1 in which the anode member comprises magnesium metal.

4. A water-activated battery according to claim 1 in which the cathode member additionally includes an organic polymer binder capable of melting and fusing the mixture to a solid state upon cooling.

5. A water-activated battery according to claim 4 in which the binder is polyvinyl chloride.

6. A water-activated battery according to claim 1 in which the cathode member comprises 50 to 95 parts by weight of cuprous chloride, 2 to 15 parts of graphite, and 0.015 to 0.035 parts by weight on a dry basis, of fluorinated ion exchange polymer having at least one pendant sulfonic acid group.

7. A water-activated battery according to claim 1 in which the cathode member comprises 50 to 95 parts by weight of cuprous chloride, 2 to 15 parts of graphite, and 0.02 to 0.03 parts by weight on a dry basis of fluorinated ion exchange polymer having at least one pendant sulfonic acid group.

8. A water-activated battery according to claim 1 having a single cell.

9. A water-activated battery according to claim 1 having multiple cells.

10. A water-activated battery according to claim 1 able to power on emergency signal light.

11. A water-activated battery according to claim 1 in which activation takes place within 60 seconds after water enters the carrier.

12. A water-activated battery according to claim 1 able to produce at least 1.25 volt for 8 hours.

13. A signal light assembly comprising a light-transmitting cover, a water-activated battery according to claim 1, at least one light bulb, and connectors to complete an electrical circuit.

* * * * *